J. W. PRICE.
CLIPPER.
APPLICATION FILED OCT. 1, 1919.
1,346,249.
Patented July 13, 1920.
2 SHEETS—SHEET 1.
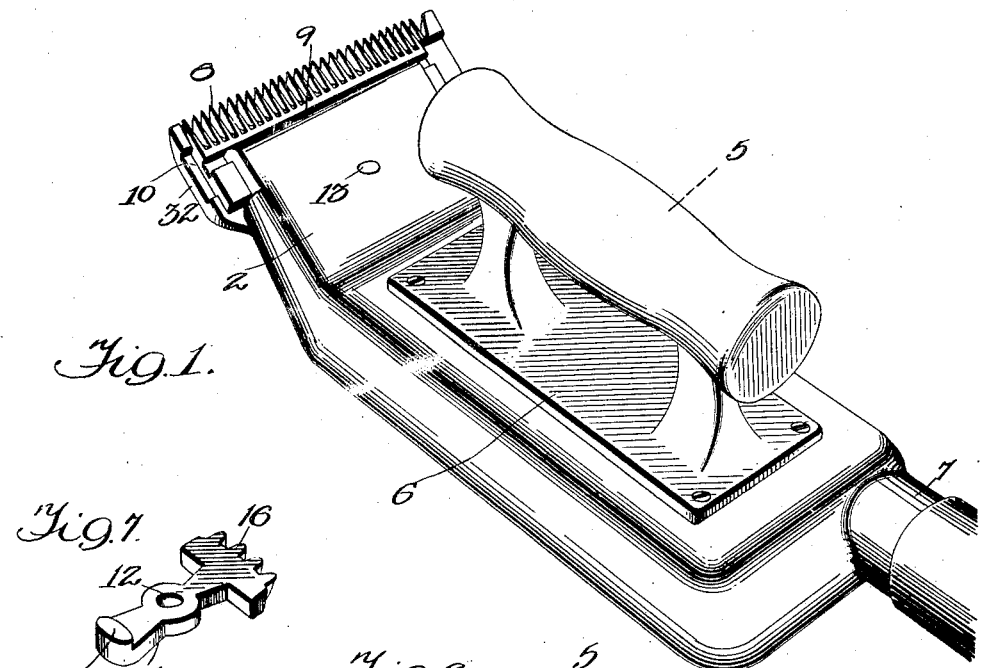
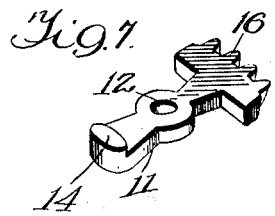
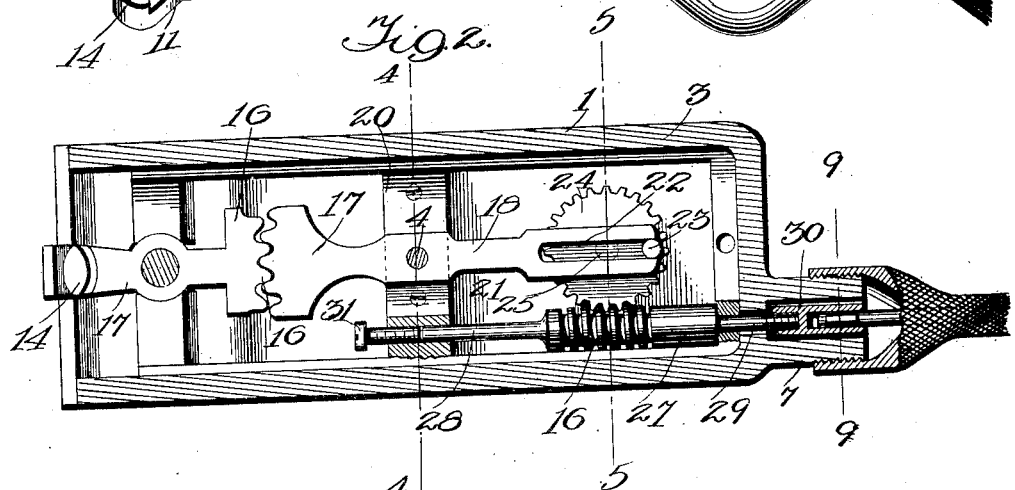
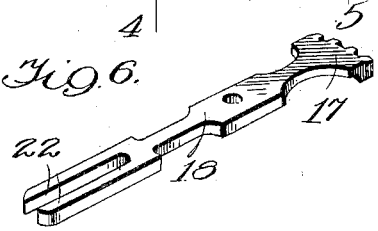
WITNESSES
George C. Myers
C. E. Trainor
INVENTOR
JAMES W. PRICE,
BY
ATTORNEYS J. W. PRICE.
CLIPPER.
APPLICATION FILED OCT. 1, 1919.
1,346,249.
Patented July 13, 1920.
2 SHEETS—SHEET 2.
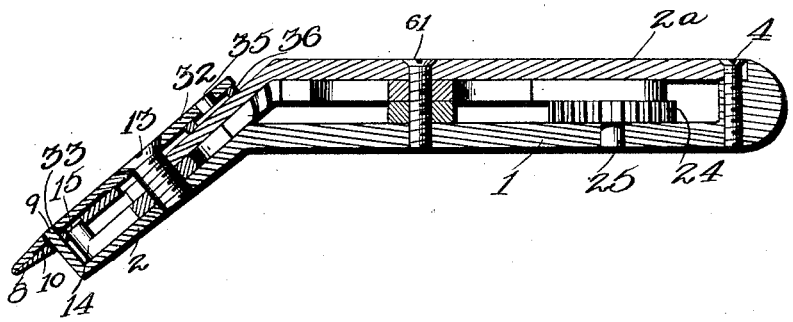
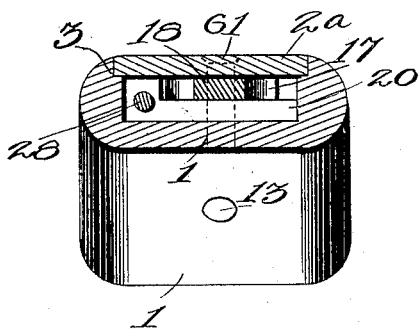
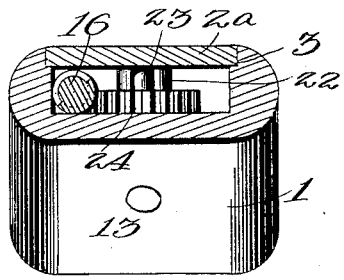
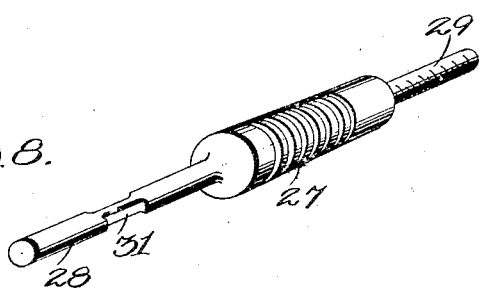
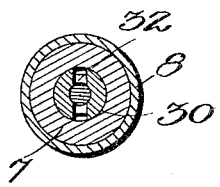
WITNESSES
INVENTOR
JAMES W. PRICE,
BY
ATTORNEYS

UNITED STATES PATENT OFFICE.

JAMES W. PRICE, OF HENRYETTA, OKLAHOMA, ASSIGNOR OF ONE-HALF TO HETTIE S. MILLER, OF HENRYETTA, OKLAHOMA, AND ONE-EIGHTH TO G. W. WEBSTER AND ONE-EIGHTH TO S. S. WEBSTER, BOTH OF TULSA, OKLAHOMA.

CLIPPER.

1,346,249.  Specification of Letters Patent.  Patented July 13, 1920.

Application filed October 1, 1919. Serial No. 327,665.

*To all whom it may concern:*

Be it known that I, JAMES W. PRICE, a citizen of the United States, and a resident of Henryetta, in the county of Okmulgee and State of Oklahoma, have made certain new and useful Improvements in Clippers, of which the following is a specification.

My invention is an improvement in clippers, and has for its object to provide a simple inexpensive mechanism of the character specified suitable for any form of clipping, wherein the parts are easily operated, may be easily disassembled for any purpose, and are practically noiseless in operation.

In the drawings:—

Figure 1 is a perspective view of the improved clippers;

Fig. 2 is a plan view with the cover plate removed;

Fig. 3 is a longitudinal section;

Figs. 4 and 5 are sections on the line 4—4 and 5—5, respectively of Fig. 2;

Fig. 6 is a perspective view of the worm controlled lever;

Fig. 7 is a similar view of the blade operating lever;

Fig. 8 is a perspective view of the worm shaft;

Fig. 9 is a section on the line 9—9 of Fig. 2.

In the present embodiment of the invention, a suitable casing 1 is provided, the said casing having a portion 2 at one end which extends at an obtuse angle with respect to the body portion of the casing. The casing is open at the convex side, and a cover plate 2ᵃ is provided for closing the open side of the casing.

As shown in Fig. 2, the casing is rabbeted at its inner edge, as indicated at 3, and the cover 2ᵃ fits within this rabbet and is secured in place by screws 4, the said screws being countersunk in the face of the cover to be flush with the face of the cover plate, and referring to Figs. 4 and 5, it will be seen that the edges of the casing are rounded.

A grip or handle 5 is connected to the body of the plate, the said grip having an attaching plate 6, which is secured to the body of the casing, in any suitable manner, as for instance by screws, as shown.

The casing has at the end remote from the portion 2, a longitudinally extending nipple 7, the said nipple being near one side of the casing, and this nipple is adapted for the passage of the flexible driving shaft as indicated, the casing of the shaft being threaded on to the nipple. The blade 8 is mounted to slide transversely of the portion 2 of the casing on the convex face, the said blade being limited in its sliding movement by an upstanding lug 9 on the end of the casing, the said lug engaging within a slot 10 extending longitudinally of the blade. The blade is operated by the lever 11, shown more specially in Fig. 7. This lever, as shown, has an opening 12 intermediate its ends, for engagement by a screw 13 which pivotally supports the lever, and one end of the lever has an upstanding lug 14 which engages an opening 15 in the blade. The other end of the lever carries a gear segment 16, which meshes with a similar segment 17, upon a lever 18 pivoted on a screw 4, which engages the cross bar 20 detachably held transversely of the casing by screws 21 or the like. That end of the lever 18 remote from the gear segment 17 is forked or longitudinally slotted as shown at 22 and the arms of the fork engage on opposite sides of a pin 23 which is mounted eccentrically upon a work wheel 24 journaled at 25 in the casing.

The worm wheel is driven by a worm 26 on a worm shaft 27 journaled in the casing, and having a chuck or clutch at its outer end for engaging the flexible shaft. The ends of the worm shaft 27 are reduced as shown at 28 and 29, respectively, and these ends engage bearing openings in the cross bar 20 and in the inner end of the nipple 7.

The chuck indicated at 30 is threaded on to the reduced end 27 of the shaft within the nipple and the end 28 is engaged by a set screw 31 which is threaded through a cross bar 20. The portion 28 of the shaft is flattened on opposite faces, as indicated at 31, for convenience in grasping the same with, for instance, a pair of pliers. The chuck 30 is a socket, being bored axially to receive the shaft and split diametrically to receive the keys 32 on the shaft, which lock the chuck to the shaft, and constrain the shaft to turn with the chuck. This mounting of the shaft 27 permits its easy removal for any purpose. All that is necessary to remove the same is to loosen the set screw 31, remove the chuck and the shaft may be moved away from the nipple to disengage the end 29, the end 28 being afterward disengaged. The journal pin 25 of the worm wheel is merely seated in an opening in the body of the casing, so that it may be easily removed.

A guard 32$^a$ is secured above the blade, by means of the screw 13 upon which the blade is pivoted, and this guard has an opening 33 for the lug 9 before mentioned. At its rear end the guard has an opening 34 through which extends a pin 35 on the forward end of the cover plate, and a cupped spring washer 36 is arranged between the guard and the cover plate.

Referring to Fig. 3 it will be seen that the spring is of larger internal diameter than the pin, and engages an enlargement on the cover plate.

All of the internal mechanism of the improved clippers is accessible and may be easily removed from the casing. A suitable lubricant may be held in the casing and the joint between the cover and the casing is oil tight to prevent the escape of the oil from the casing.

The construction is simple, inexpensive and practically noiseless for the teeth of the gear segments fit closely and there is no rattling or clicking between them.

It will be understood that the guard 32$^a$ is the fixed blade, with which the movable blade 8 coöperates, the two blades constituting shears cutting the hair between them with a shearing action.

I claim:—

1. In clippers, a casing having one side open, a plate carrying a series of fixed blades secured to the casing at one end of the open side and with the fixed blade extending beyond the adjacent end of the casing, a cover plate for closing the said side and extending beneath the blade carrying plate at their adjacent ends, said plates being detachably secured to the casing, a series of movable blades coöperating with the fixed blades, and means for operating the movable blades, said means comprising a pair of levers arranged in alinement and geared together at their adjacent ends, one of the levers engaging in the blade at the end remote from the gear connection, the other lever being forked at the end remote from the gear section, a worm wheel having an eccentric pin engaging between the arms of the fork and a worm shaft journaled in the casing and engaging the worm, said worm shaft having reduced ends and the casing having reduced bearings for engagement by the said reduced end, a chuck detachably connected with the outer end of the shaft on the opposite side of the bearing from the body of the shaft, and a set screw threaded through the other bearing and engaging the end of the shaft.

2. In clippers, a casing consisting of two portions extending at an obtuse angle with respect to each other and open at the convex side, a plate carrying a series of fixed blades detachably connected with the casing at the end of one of the said portions and arranged with the blades extending beyond the said end of the casing, a cover plate shaped to fit the open side of the casing, said casing being rabbeted to receive the edges of the cover plate and said plate extending beneath the blade carrying plate, means for detachably connecting the cover plate and the blade carrying plate to the casing, a series of movable blades coöperating with the fixed blades and operating mechanism for the blades held within the casing.

3. In combination, a casing, a series of fixed blades, a series of movable blades coöperating therewith, and means for operating the movable blades, said means comprising a pair of levers arranged in alinement and geared together at their adjacent ends, one of the levers engaging in the blade at the end remote from the gear connection, the other lever being forked at the end remote from the gear section, a worm wheel having an eccentric pin engaging between the arms of the fork and a worm shaft journaled in the casing and engaging the worm, said worm shaft having reduced ends and the casing having reduced bearings for engagement by the said reduced end, a chuck detachably connected with the outer end of the shaft on the opposite side of the bearing from the body of the shaft, and a set screw threaded through the other bearing and engaging the end of the shaft.

JAMES W. PRICE.